(12) United States Patent
Banerjee et al.

(10) Patent No.: US 9,892,041 B1
(45) Date of Patent: Feb. 13, 2018

(54) CACHE CONSISTENCY OPTIMIZATION

(71) Applicant: Veritas Technologies LLC, Mountain View, CA (US)

(72) Inventors: Anindya Banerjee, Maharashtra (IN); Ryan Lefevre, Sunnyvale, CA (US)

(73) Assignee: Veritas Technologies LLC, Mountain View, CA (US)

( * ) Notice: Subject to any disclaimer, the term of this patent is extended or adjusted under 35 U.S.C. 154(b) by 354 days.

(21) Appl. No.: 14/502,527

(22) Filed: Sep. 30, 2014

(51) Int. Cl.
*G06F 12/08* (2016.01)
*G06F 12/0815* (2016.01)
*G06F 12/0866* (2016.01)
*G06F 17/30* (2006.01)

(52) U.S. Cl.
CPC ...... *G06F 12/0815* (2013.01); *G06F 12/0866* (2013.01); *G06F 17/30088* (2013.01); *G06F 17/30132* (2013.01); *G06F 2212/621* (2013.01)

(58) Field of Classification Search
CPC .............. F06F 12/0815; F06F 12/0866; G06F 17/30088; G06F 17/30132; G06F 2212/621; G06F 12/0815; G06F 12/0866
See application file for complete search history.

(56) References Cited

U.S. PATENT DOCUMENTS

| | | | | |
|---|---|---|---|---|
| 5,185,792 A | * | 2/1993 | Shimada | G11B 5/86 360/60 |
| 5,963,962 A | * | 10/1999 | Hitz | G06F 11/1435 |
| 5,996,047 A | * | 11/1999 | Peacock | G06F 17/30067 707/E17.01 |
| 6,332,200 B1 | * | 12/2001 | Meth | G06F 11/1458 707/999.202 |
| 6,711,632 B1 | * | 3/2004 | Chow | G06F 12/0804 709/237 |

(Continued)

OTHER PUBLICATIONS

Douglas S. Santry, Michael J. Feeley, Norman C. Hutchinson, Alistair C. Veitch, Ross W. Carton, and Jacob Ofir. 1999. Deciding when to forget in the Elephant file system. In Proceedings of the seventeenth ACM symposium on Operating systems principles (SOSP '99). ACM, New York, NY, USA, 110-123.*

(Continued)

*Primary Examiner* — David X Yi
*Assistant Examiner* — Ramon A Mercado
(74) *Attorney, Agent, or Firm* — Campbell Stephenson LLP

(57) ABSTRACT

Various methods and systems for optimizing cache consistency are disclosed. For example, one method involves writing data to a file during a write transaction. The file is stored in a persistent storage device and cached in a non-volatile storage device. The method determines if an in-memory flag associated with the persistent storage device set. If the in-memory flag is not set, the method increases a generation count associated with the persistent storage device before a write transaction is performed on the file. The method then sets the in-memory flag before performing the write transaction on the file. In other examples, the method involves using a persistent flag associated with the non-volatile storage device to maintain cache consistency during a data freeze related to the taking of a snapshot by synchronizing generation counts associated with the persistent storage device and the non-volatile storage device.

20 Claims, 8 Drawing Sheets

(56) References Cited

U.S. PATENT DOCUMENTS

| | | | |
|---|---|---|---|
| 6,725,342 B1* | 4/2004 | Coulson | G06F 12/0804 711/135 |
| 7,636,814 B1* | 12/2009 | Karr | G06F 12/0804 711/143 |
| 7,653,668 B1* | 1/2010 | Shelat | G06F 11/2094 707/610 |
| 7,707,165 B1* | 4/2010 | Jiang | G06F 17/30067 707/806 |
| 7,937,404 B2* | 5/2011 | Tripathi | G06F 12/0862 707/770 |
| 8,473,690 B1* | 6/2013 | Condict | G06F 12/0815 711/141 |
| 8,904,117 B1* | 12/2014 | Kalekar | G06F 12/0804 711/119 |
| 8,904,120 B1* | 12/2014 | Killamsetti | G06F 13/00 707/692 |
| 8,984,221 B2* | 3/2015 | Satoyama | G06F 3/0605 711/114 |
| 9,424,189 B1* | 8/2016 | Patil | G06F 12/0868 |
| 2003/0159007 A1* | 8/2003 | Sawdon | G06F 11/1435 711/154 |
| 2004/0088301 A1* | 5/2004 | Mahalingam | G06F 17/30067 |
| 2005/0192932 A1* | 9/2005 | Kazar | G06F 17/30067 |
| 2006/0064416 A1* | 3/2006 | Sim-Tang | G06F 17/3015 |
| 2006/0085679 A1* | 4/2006 | Neary | G06F 11/1438 714/13 |
| 2006/0168402 A1* | 7/2006 | Ahmad | G06F 12/0808 711/141 |
| 2009/0193195 A1* | 7/2009 | Cochran | G06F 12/126 711/133 |
| 2012/0054152 A1* | 3/2012 | Adkins | G06F 17/30371 707/623 |
| 2012/0095971 A1* | 4/2012 | Shyam | G06F 17/30171 707/690 |
| 2012/0215970 A1* | 8/2012 | Shats | G06F 12/0866 711/103 |
| 2013/0254488 A1* | 9/2013 | Kaxiras | G06F 12/0815 711/130 |
| 2013/0275653 A1* | 10/2013 | Ranade | G06F 3/0605 711/103 |
| 2013/0346724 A1* | 12/2013 | Ranade | G06F 12/0223 711/173 |
| 2015/0006846 A1* | 1/2015 | Youngworth | G06F 3/0689 711/216 |
| 2015/0161048 A1* | 6/2015 | Patil | G06F 17/30132 711/141 |

OTHER PUBLICATIONS

Mohit Saxena, Michael M. Swift, and Yiying Zhang. 2012. FlashTier: a lightweight, consistent and durable storage cache. In Proceedings of the 7th ACM european conference on Computer Systems (EuroSys '12). ACM, New York, NY, USA, 267-280.*

Michael N. Nelson, Brent B. Welch, and John K. Ousterhout. 1988. Caching in the Sprite network file system. ACM Trans. Comput. Syst. 6, 1 (Feb. 1988), 134-154.*

* cited by examiner

CACHE CONSISTENCY OPTIMIZATION

FIELD OF THE INVENTION

This invention relates to caching data and, more particularly, to optimizing cache consistency.

DESCRIPTION OF THE RELATED ART

Caching is a technique that allows data that is being accessed (or is likely to be accessed in the near future) by an application, such as a database management system (DBMS), to be temporarily stored in a faster storage device. Caching can reduce the time the application takes to access data, and thus is a technique that is often used to improve application performance. Accordingly, the performance of the application can be improved by caching data the application uses in a faster storage device.

An example of a storage device used in caching is a solid-state disk (SSD) drive. An SSD drive is a data storage device that uses integrated circuit assemblies as memory to store data. Because SSD devices do not have moving mechanical components, they are faster, but typically more expensive, than slower primary storage devices. An example of a primary storage device is a hard disk drive (HDD). Therefore, it is advantageous to cache frequently-accessed data in an SSD drive so that the data can be served to the application in an expeditious manner.

A common type of cache is a write-through cache. Write-through caches provide a good balance of performance and reliability. In a write-through cache, updates by an application to the cached data are stored in both the primary storage device as well as the cache. In a write-through cache implementation, modified blocks of data within the cache are written back from the cache to the primary storage device. Modified blocks of data are blocks of data that the cache indicates have been modified since those blocks were moved into the cache. Such blocks of data can also be described as "dirty."

It is important to maintain the consistency of cached data in order to ensure that a user does not get stale data. Stale data is data that is inadvertently served to an application after the data has already been modified. A user can encounter stale data if the user's application is served data which has since been modified. In a write-through cache implementation, a user can encounter stale data if the application is served data from a cache, where if the data stored in the given cache location has since been modified in a corresponding location in a primary storage device, but the modification has not been stored in (or written back to) the cache.

SUMMARY OF THE INVENTION

Various methods and systems for optimizing cache consistency are disclosed. One such method involves writing data to a file during a write transaction. In this example, the file is stored in a persistent storage device (PSD) and in a non-volatile storage device (NVSD). The method then determines if a persistent storage device flag (PSD flag) is set. In this example, the PSD flag is an in-memory flag. If the PSD flag is not set, the method increases a generation count (also called a generation number) associated with the PSD before the write transaction is performed on the file. The method then sets the PSD flag. The PSD flag is created in an inode of the PSD prior to writing data to the file stored in the PSD and in the NVSD, and in one example, increasing the generation count associated with the PSD and setting the PSD flag is also performed prior to the write transaction. In this example, the PSD flag is maintained in-core.

In some embodiments, a subsequent write transaction associated with the file is detected. An increase of the generation count associated with the PSD is inhibited and/or prevented in response to detecting the subsequent write transaction by accessing metadata associated with the persistent storage device (PSD metadata) which indicates that the PSD flag (in-memory flag) is set. The method can also inhibit and/or prevent the increase of a generation count associated with the NVSD after the write transaction and the subsequent write transaction, which in one example, are both write-through cache transactions.

In other embodiments, the method includes accessing PSD metadata during the subsequent write transaction, and determining whether the PSD metadata indicates that the PSD flag is set. If the PSD metadata indicates that the PSD flag is not set, the method only increases the generation count associated with the PSD, maintains the generation count associated with the NVSD, and sets the PSD flag. If the PSD metadata indicates that the PSD flag is set, the method proceeds with the subsequent write transaction without increasing the generation count associated with the PSD or the generation count associated with the NVSD.

According to one embodiment, the generation count associated with the PSD tracks the number of write transactions (or any other transactions which modify data) associated with the file stored in the PSD, except when the increase of the generation count associated with the PSD is inhibited and/or prevented by the setting of the PSD flag.

According to another embodiment, the method copies the generation count from the inode of the PSD to an inode of the NVSD. The copying occurs after the subsequent write transaction and during deactivation of the inode of the PSD, which in one example, is deactivated after a last close of the file. The method then clears the PSD flag in the inode of the PSD. In this example, clearing the PSD flag permits an increase of the generation count associated with the PSD upon a future write transaction.

In one or more embodiments, the method detects a freeze of data in the PSD and determines whether the freeze is the result of a snapshot. If the freeze is the result of a snapshot, the method sets a NVSD flag in the inode of NVSD. The NVSD flag is set in the inode of the NVSD at the same time the PSD flag is set. In this example, the NVSD flag is maintained on-disk. Upon restoration of the snapshot, the method detects the NVSD flag in the inode of the NVSD and serves data from the PSD instead of the NVSD.

In some embodiments, the NVSD flag is then cleared after copying the generation count associated with the PSD from the inode of the PSD to the inode of the NVSD. In other embodiments, the NVSD flag is cleared only after either the data corresponding to inode of the NVSD is invalidated or synchronized with the data in the PSD. Detecting the NVSD flag in the inode of the NVSD can indicate inconsistency between data stored in the PSD and data stored in the NVSD.

In some embodiments, the method detects another cache transaction and, upon detection, increases the generation count associated with the PSD, but not the generation count associated with the NVSD. In this example, the generation count associated with the NVSD is not increased because the last close of the file has not yet occurred. The method then sets the PSD flag in the inode of the PSD. The method then detects another snapshot of data in the PSD. In this example, the another snapshot is taken after the another cache transaction.

In one embodiment, the taking of the another snapshot causes a file system structure associated with the PSD and the NVSD to experience a data freeze. During the data freeze, the method synchronizes the generation count associated with the PSD and the generation count associated with the NVSD, and clears the PSD flag in the inode of the PSD. The method then detects one or more cache transactions after the another cache transactions which causes the increase of the generation count associated with the PSD. The method then sets the NVSD flag in the inode of the NVSD.

The foregoing is a summary and thus contains, by necessity, simplifications, generalizations and omissions of detail; consequently those skilled in the art will appreciate that the summary is illustrative only and is not intended to be in any limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
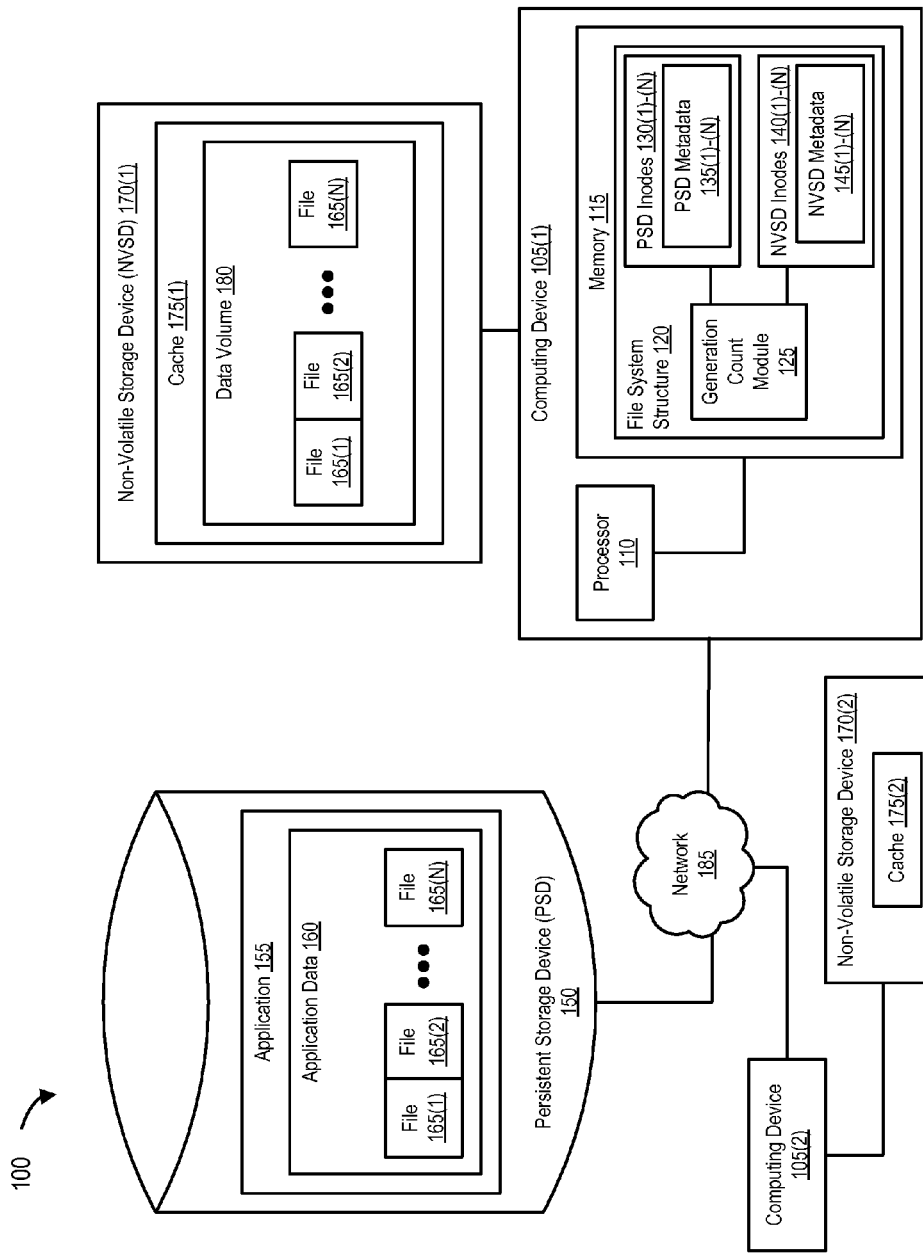
FIG. 1 is a block diagram of a computing system that uses a cache, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Introduction

One common mechanism to ensure consistency of data between a primary storage device and a SSD device in a write-through cache implementation is to use a generation number, which is maintained in copies of data on both the primary storage device and the SSD device. Data is served from the SSD device only if the generation number of the SSD devices matches the generation number of the primary storage device. However, such a solution requires the generation number to be updated on both the primary storage device and the SSD device each time the copy of data is modified or updated.

A generation number can be stored in an inode associated with a storage device. An inode is a data structure used to represent a file system object, which can include a file or a directory. Each inode stores the attributes and disk block location(s) of the file system object's data. An inode can be used to store generation numbers (also called generation counts) for storage devices (e.g., a primary storage device or a SSD device) that are associated with the file system.

A generation number or generation count is an integer, and as discussed, is stored in an inode of a storage device (e.g., a primary storage device or a SSD device). The generation number is used to count (and keep track of) the number of write transactions performed, for example, on a file stored in the primary storage device and/or cached in the SSD device. In this example, the generation number associated with the primary storage device is maintained in the inode of the primary storage device, and the generation number associated with the SSD device is maintained, separately, in the inode of the SSD device.

During a conventional write-through cache transaction, the generation number is updated on both the primary storage device and the SSD device each time the copy of data (e.g., a file) is modified and/or updated (e.g., written to) by an application (e.g., a DBMS). Data is served to the application from the SSD device if the generation number associated with the SSD devices matches the generation number associated with the primary storage device. The matching of generation numbers between the primary storage device and the SSD device ensures that data that is being served to the application is the most up-to-date copy of the data.

However, frequently increasing the generation number, for example, after each write transaction, can slow down updates to storage devices and may negatively affect system performance. Therefore, updating the generation number minimally (or even just once)—no matter how many write transactions (or other types of transactions that modify data) are performed on a copy of data by an application, may be advantageous to speed up updates to storage devices. The generation number (also referred to herein as a generation count) is an integer that keeps count of (and tracks) the number of updates and/or modifications performed to a copy of data by an application (e.g., in the form of write transactions).

Increasing the Generation Count for Multi-Updates

FIG. 1 is a block diagram of a computing system. This system include one or more computing devices (e.g., computing devices 105(1) and 105(2)), each of which can be coupled to a persistent storage device (PSD) and a non-volatile storage device (NVSD). As shown, computing device 105(1) is coupled to NVSD 170(1) that implements a cache 175(1). Computing device 105(1) can be any of a variety of different types of computing devices, including a server, a personal computing device, laptop computer, net book, personal digital assistant, cellular phone, or the like.

Computing device 105(1) is also coupled to a PSD 150. PSD 150 can include one or more of a variety of different storage devices, including hard disks, compact discs, digital versatile discs, solid state drive (SSD) memory such as Flash memory, and the like, or one or more logical storage devices such as volumes implemented on one or more such physical storage devices. PSD 150 is described as providing persistent storage because data stored on PSD 150 can be maintained (e.g., for a non-negligible time, such as several minutes, hours, days, weeks, years, decades, and so on), even if the power to PSD 150 and/or to a drive that reads and writes to PSD 150 is interrupted or cycled off for a non-negligible time.

Computing device 105(1) is also coupled to a NVSD 170(1). In this example, NVSD 170(1) is a SSD such as Flash memory, or the like, and is useful for implanting cache 175(1) so that data (e.g., frequently accessed data) can be served to application 155 in an expeditious manner, versus, for example, from a slower primary storage device which may use a hard disk drive (HDD). However, NVSD 170(1) can include one or more of a variety of different storage devices, including hard disks, compact discs, digital versatile discs, and the like, or one or more logical storage devices such as volumes implemented on one or more such physical storage devices.

Because application data 160 in a modern database can include very large amounts of data (e.g., in terms of gigabytes, terabytes, or larger), and because a user can specify large portions (or even all of) application data 160 to be processed in a given database operation, extremely large amounts of data may be included at a given time. Because storage devices such as PSD 150 are often, due to reasons of cost, reliability, and the like, unable to provide as high access performance as other types of storage devices, the time needed to access data on such a persistent storage device is often a limiting factor. Accordingly, many systems use a storage device that can be accessed more quickly to temporarily cache the portions of the application data that are currently needed by the DBMS in order to improve DBMS performance Here, cache 175(1) is implemented on such a device, which in this example is NVSD 170(1).

Computing device 105(1) and PSD 150 can be integrated (e.g., where the persistent storage device is coupled to the node's internal processing devices by an internal bus and is built within the same chassis as the rest of the node) or separate. If separate, computing device 105(1) and PSD 150 can be coupled by a local connection (e.g., using a technology such as Bluetooth™, Peripheral Component Interconnect (PCI), Small Computer System Interface (SCSI), or the like) or (as shown in this example) via one or more networks 185 such as the Internet or a storage area network.

In this example, computing device 105(1) implements a file system structure 120. File system structure 120 is a part of a file system, which is a software program that organizes and controls access to files. Here, file system structure 120 controls access to the files used by application 155 stored on PSD 150, including application data 160 and associated files 165(1)-(N). File system structure 120 can maintain metadata (e.g., PSD metadata 135(1)-(N) and NVSD metadata 140(1)-(N)) that identifies each file (e.g., by a file name) and the number of times the file has been updated and/or modified by application 155. PSD metadata 135(1)-(N) and NVSD metadata 140(1)-(N) can also identify the location of each file on a storage device (e.g., PSD 150 or NVSD 170(1)), each file's size, and other information such as the file's creation time, most recent access time, and the like. Such information can be maintained in an inode structure for certain types of files systems (e.g., PSD inodes 130(1)-(N) for PSD metadata 135(1)-(N) and NVSD inodes 140(1)-(N) for NVSD metadata 145(1)-(N) respectively).

The term "file system structure" can refer to both the software application (which itself can be part of an operating system or database) that organizes the files and the collection of files that are organized by that application. Files can be organized hierarchically, with directories collecting groups of files and/or other directories. A file system structure like file system structure 120 can provide another application, such as a DBMS application, with access to files (e.g., to open, read, modify, create, delete, and otherwise interact with the data within the files).

File system structure 120 also implements a generation count module (e.g., generation count module 125). Generation count module 125 tracks the number of times a file stored in a storage device is accessed for updating and/or modification (e.g., any operation such as write operation that causes modifications to the data stored on the storage device). For example, generation count module 125 can interact with PSD inodes 103(1)-(N) to track the number of times a file in PSD 150 is accessed for modification by application 155 based on information provided by PSD metadata 135(1)-(N). Similarly, generation count module 125 can also interact with NVSD inodes 140(1)-(N) to track the number of times a file in NVSD 170(1) is accessed for modification by application 155 based on information provided by NVSD metadata 145(1)-(N). This way, when an application such as a database requests access to a particular file (e.g., using the file name of the file), the file system structure can translate that request into a generation count (or generation number) to be tracked by generation count module 125.

Accordingly, the file system structure implemented by computing device 105(1) knows how many times each file in PSD 150 and/or NVSD 170(1) has been accessed by application 155 for modification. This knowledge (based on PSD metadata and NVSD metadata maintained by the file system structure) allows file system structure 120 to selectively apply different generation count policies to different files within one or more storage devices, based upon the number of times the file stored and/or cached in each of those storage device is accessed for modification. In other words, generation count module 125 can determine whether or not to increase the generation count of a file in PSD 150 or NVSD 170(1) after the file is accessed, for example, by application 155, for modification (e.g., by way of a write operation).

In existing cache systems, all modified files within the cache (i.e., files that the cache indicates have been modified since those files were moved into the cache; such files can also be described as "dirty" files) are written back to the underlying storage device (e.g., when those files are initially modified within the cache in a "write-though" cache implementation). Each time data needs to be written back to the underlying storage device (e.g., PSD 150) though, update performance may be negatively affected, because existing cache systems update the generation count associated with each storage device for each and every modification to the data stored and/or cached on these storage devices. However, it may be possible to potentially improve performance by limiting, inhibiting, or preventing an increase in generation count each time data in the aforementioned storage devices is modified and/or updated.

Unlike convention caching mechanisms, generation count module 125 is implemented as part of file system structure 120 and thus has access to PSD metadata 135(1)-(N) and NVSD metadata 145(1)-(N) that track the number of modifications to files in PSD 150 and NVSD 170(1) respectively. Additionally, PSD metadata 135(1)-(N) and NVSD metadata 145(1)-(N) can be helpful to generation count module 125 in limiting, inhibiting, or preventing an increase in generation count each time a file on PSD 150 and/or NVSD 170(1) is accessed for modification. Based upon these two sets of information, generation count module 125 can also selectively handle different files differently when those files are modified, for example, depending on whether these files are required for the purposes of a snapshot.

Accordingly, in one embodiment, when data is first written to file 165(1), a determination is made whether a persistent storage device flag (PSD flag) is set. It should be noted that a PSD flag, although associated with a persistent storage device in this example, is not a persistent flag, but rather, is an in-memory flag. In this example, file 165(1) is stored in PSD 150 and cached in NVSD 170(1). If the PSD flag is not set, a generation count associated with PSD 150 (not NVSD 170(1)) is increased one time before a write transaction is performed on file 165(1). Therefore, the PSD flag is set before data is written to file 165(1) during the write transaction. In response to detecting a subsequent write transaction associated with file 165(1), generation count module 125 inhibits (or prevents) the increase of the generation count associated with PSD 150 (also called PSD cgen) by virtue of accessing PSD metadata 135(1) which indicates to generation count module 125 that the PSD flag is set.

Figure 2A:
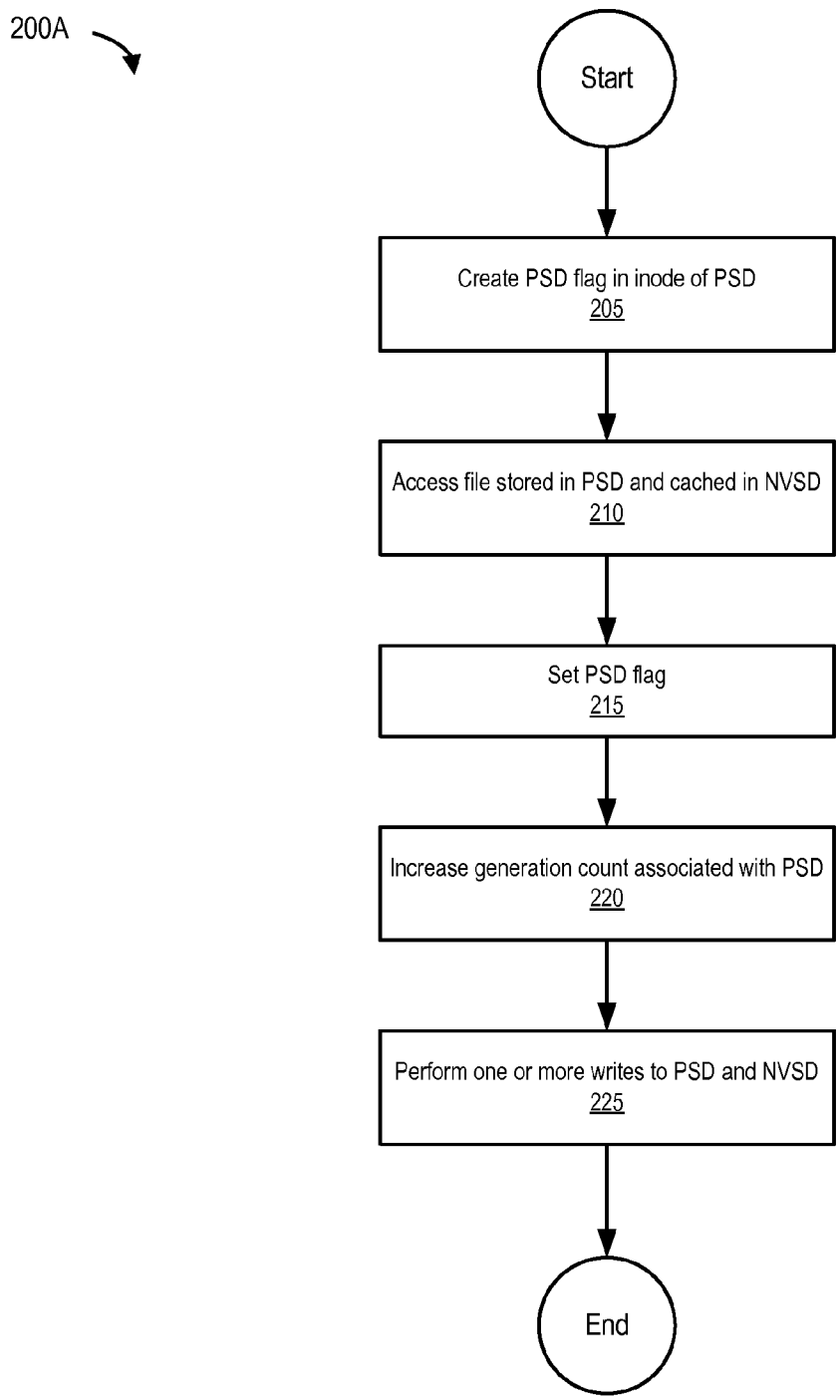
FIG. 2A is a flowchart of a method of increasing a generation count associated with a persistent storage device, according to one embodiment of the present invention.

FIG. 2A is a flowchart that illustrates a method for increasing a generation count associated with PSD 150. At 205, the PSD flag, which, for example, can be an in-memory flag (also called ICGENDIRTY), is created in PSD inode 130(1) associated with PSD 150 before (or prior to) writing data to file 165(1). It should be noted that the ICGENDIRTY flag is not originally present in on-disk inodes. At 210, the method accesses file 165(1), which in one embodiment, is stored in PSD 150 and cached in NVSD 170(1). At 215, the method sets the PSD flag. In some embodiments, the PSD flag is set before performing a first write transaction associated with file 165(1). At 220, the generation count associated with PSD 150 (but not NVSD 170(1)) is increased. At method ends at 225, by permitting one or more writes to PSD 150 and NVSD 170(1)) (e.g., in a "write-through" cache implementation). It should be noted that only the generation count associated with PSD 150 is increased before the first write transaction. Generation count module 125 prevents the increase of a generation count associated with NVSD 170(1) (NVSD cgen) (e.g., by accessing NVSD metadata) after the first write transaction and even after subsequent write transactions, at least until application 155 is still writing data to file 165(1) and/or to other files in PSD 150 and/or NVSD 170(1).

Figure 2B:
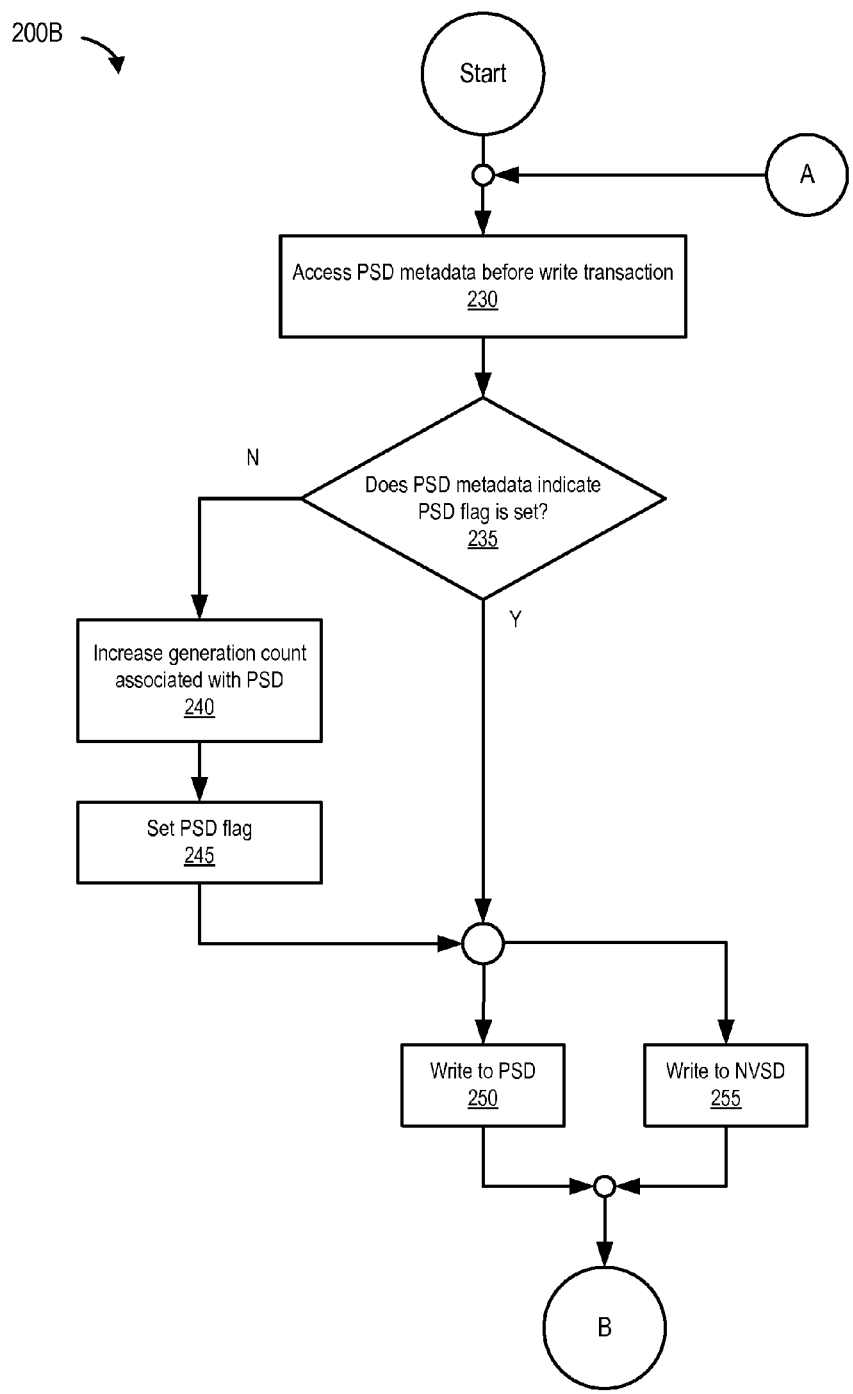
FIG. 2B is a flowchart of a method of setting an in-memory flag, according to one embodiment of the present invention.

FIG. 2B is a flowchart of a method of accessing PSD metadata before a write transaction that is performed on a file stored in a PSD and cached in a NVSD. The method begins at 230 by accessing PSD metadata 135(1)-(N) before a write transaction. At 235, the method determines whether the PSD metadata indicates that the PSD flag is set. If the PSD flag is not set, the method, at 240, increases the generation count associated with PSD 150 and sets the PSD flag. If the PSD flag is set, the method writes data to both PSD 150, at 250, and to NVSD 170(1), at 255. In this manner, subsequent writes will find that the PSD flag is set and the generation count associated with PSD 150 will not be increased, no matter how many subsequent write transactions are performed on data stored in PSD 150 (e.g., by application 155).

Figure 2C:
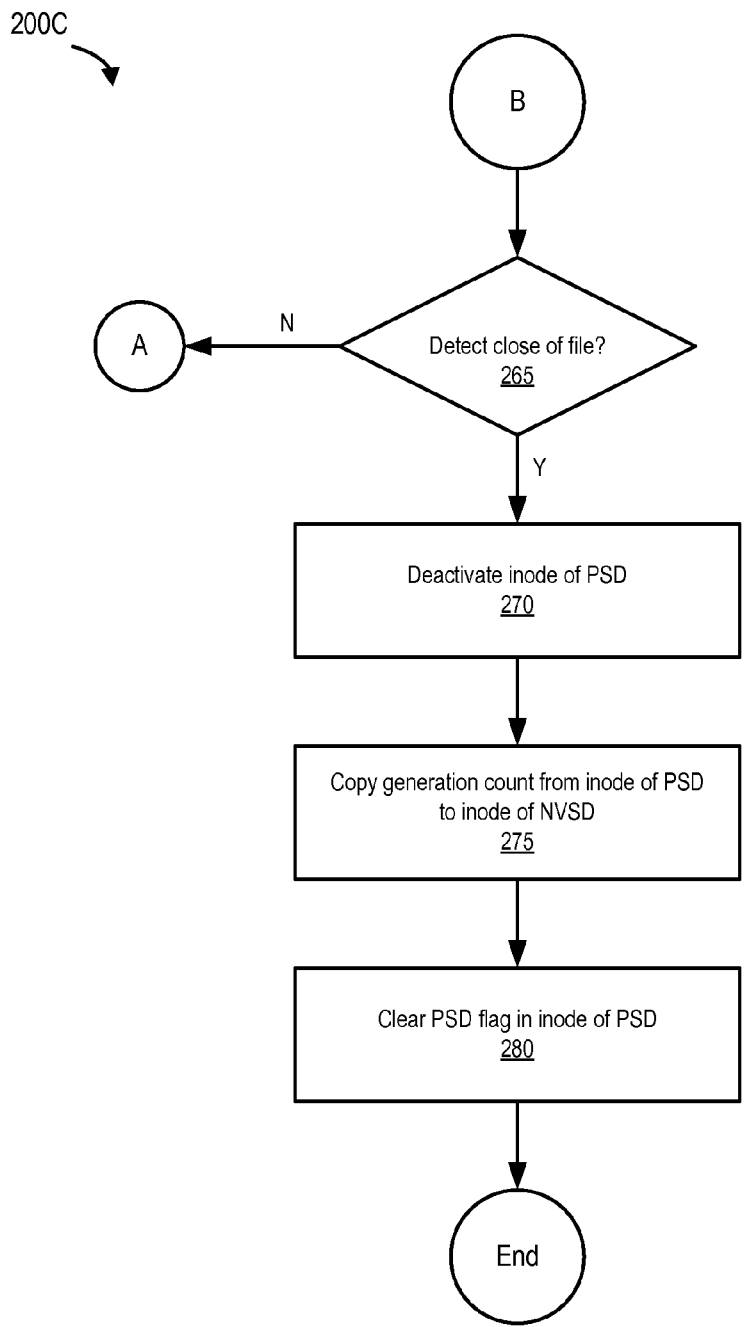
FIG. 2C is a flowchart of a method of copying a generation count, according to one embodiment of the present invention.

FIG. 2C is a flowchart of a method of maintaining cache consistency by ensuring that only up-to-date data is served to application 155. The method begins at 265 by detecting a close of file 165(1). In this example, detecting the close of a file detects the last close of a file. In a complex database system, a file and various instances thereof, can be accessed, opened, closed, and/or otherwise modified by multiple different applications and/or users. In this example, the method, at 265, detects a last close of the file which, according to one embodiment, is a scenario where the file in question in not being used by any application and/or user (e.g., no instance of the file open). If the file is still open and has not been closed, the method reverts back to the method of FIG. 2A beginning at step 230.

If the method does detect a last close of the file (e.g., file 165(1) or any other file that is being written to by application 155), the method, at 265, deactivates the inode of PSD 150, and at 275, copies the generation count from the inode of PSD 150 to the inode of NVSD 170(1) (e.g., from PSD inode 130(1) to NVSD inode 140(1)). The method ends at 280 by clearing the PSD flag in the PSD inode (only if and after the generation count is copied from the PSD inode to the NVSD inode). In this manner, because the generation counts of PSD 150 and NVSD 170(1) are the same (e.g., after the copying of 275), cache consistency is maintained and application 155 can be served data from NVSD 170(1) (or PSD 150) because the most up-to-date copy of file 165(1) (or other files 165(2)-(N)) is identical on both PSD 150 and NVSD 170(1).

However, in a write-through cache implementation, a system crash can cause data inconsistency. For example, if computing device 105(1) crashes, it is possible that data may have been written to PSD 150, but not NVSD 170(1) (e.g., computing device 105(1) may crash right after data is written to PSD 150, but before the data has been written to NVSD 170(1) or vice-versa). In this scenario, once computing device 105(1) reboots, generation count module 125 has knowledge that the generation counts of PSD 150 and NVSD 170(1) do not match because the generation count of PSD 150 has not been copied over to the inode of NVSD 170(1)). In this situation, and in one embodiment, application 155 is only served data from PSD 150 and not from NVSD 170(1) because generation count module 125 has knowledge of the mismatch in generation counts (e.g., by accessing PSD metadata and NVSD metadata). In some embodiments, if a write transaction fails on both PSD 150 and NVSD 170(1), the NVSD inode is marked with a data I/O error flag (e.g., a DATAIOERR flag), and if the PSD flag is set, the generation count associated with NVSD 170(1)) (NVSD cgen) is not updated. Likewise, in this example, data is served to application 155 from PSD 150, and not from NVSD 170(1).

Therefore, by limiting, inhibiting, and/or preventing the increase of the generation count after each transaction associated with a file, generation count module 125, in conjunction with PSD metadata and NVSD metadata, can help maintain the consistency of data that is served to application 155 while improving the speed of updates in a write-through cache implementation. However, when the above solution is implemented in a write-through cache implementation, at least two situations can arise where the generation counts associated with PSD 150 and NVSD 170(1) are the same (identical), but the data between the two storage devices is inconsistent. These two scenarios, both of which involve a file system freeze, for example, as a result of a snapshot operation, are discussed below.

Maintaining Cache Consistency

A snapshot is a point-in-time copy of data stored in a storage device. For example, a snapshot taken of data in PSD 150 at time t-zero contains the complete data of all files

165(1)-(N) (e.g., application data 160). Data can be restored from a snapshot and an application can be served this data as the data existed at the time the snapshot was taken. However, in the context of limiting, inhibiting, and/or preventing the increase of the generation count after each transaction associated with a file as described above, data inconsistency can arise if the data included in the file is served from a previously taken snapshot, and the system (e.g., computing device 105(1)) crashes after one or more subsequent write transactions, but before the generation count associated with the NVSD (NVSD cgen) is updated.

For example, as discussed above, after the last close of the file described in FIG. 2C, the generation count of PSD 150 is copied from the PSD inode to the NVSD inode. After the copying of the generation count to the NVSD inode, both PSD 150 and NVSD 170(1) have identical generation counts. If a volume-level snapshot is taken at this point (e.g., when the generation counts associated with both PSD 150 and NVSD 170(1) are the same), the snapshot will reflect the same generation counts. If, for example, computing device 105(1) crashes after additional write transactions are performed (e.g., write transactions performed after the taking of the snapshot and after the clearing of the PSD flag as illustrated in FIG. 2C, but before the generation count has been copied over from the PSD inode to the NVSD inode again), implementing the method illustrated in FIGS. 2A-2C would result in the increase of the generation associated with PSD 150, but not the generation count associated with NVSD 170(1).

However, if a restoration operation is performed after the crash, and data for application 155 is served from the snapshot, the generation counts reflected by the data in the snapshot will be identical for both PSD 150 and NVSD 170(1) by virtue of the snapshot being taken before the additional write transactions and before the crashing of computing device 105(1), but after the copying of the generation count to the NVSD inode from the PSD inode. Therefore, serving data from a snapshot to application 155 after a system crash, results in a scenario where both PSD 150 and NVSD 170(1) have the same generation counts, but the data between the two storage devices is different, and thus, inconsistent.

Figure 3A:
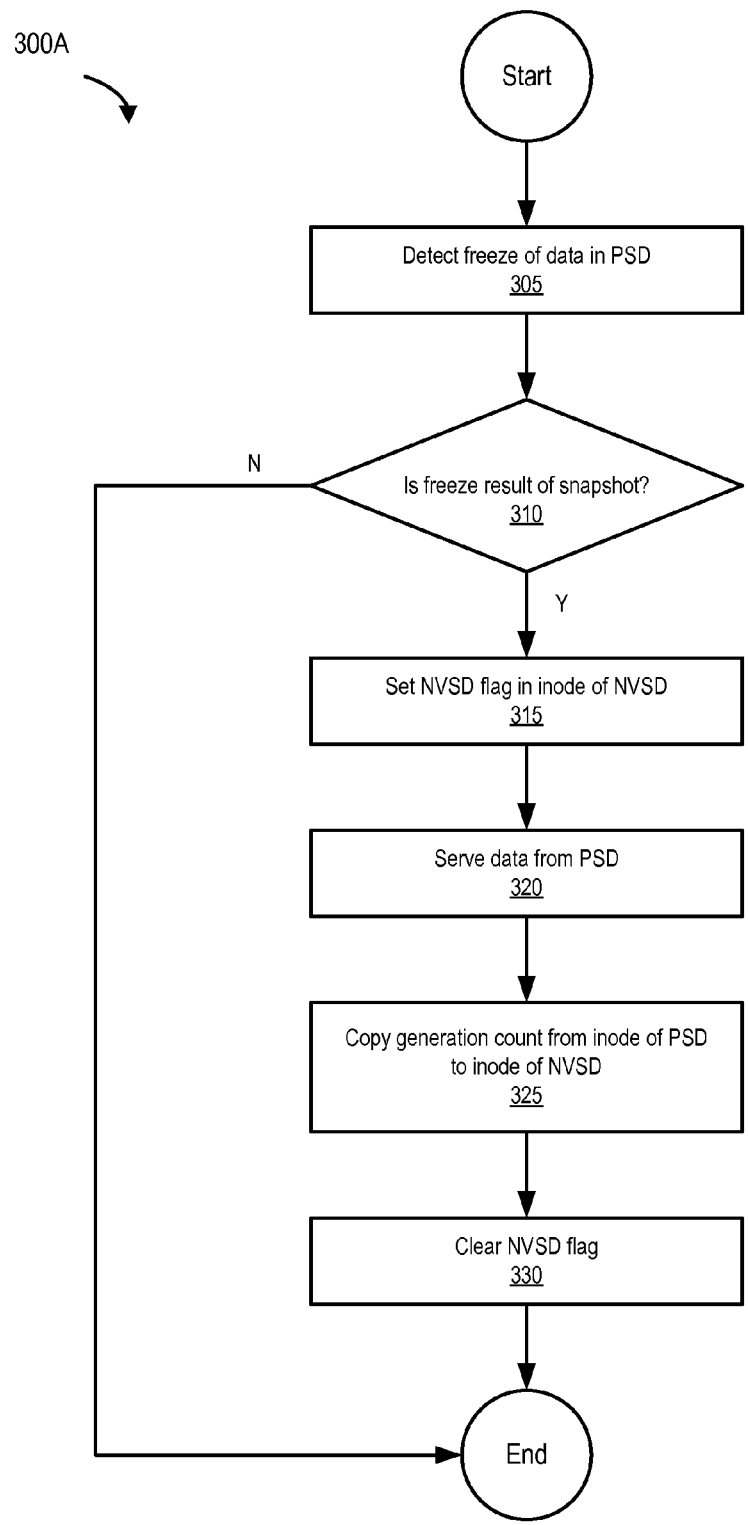
FIG. 3A is a flowchart of optimizing cache consistency between storage devices after a file system freeze due to a snapshot, according to one embodiment of the present invention.

FIG. 3A is a flowchart of a method of maintaining cache consistency in a file system data freeze scenario. The method begins at 305 by detecting a freeze of data in the PSD. A data freeze prevents access to data in storage devices by applications which write data to files in the storage devices. For example, file system structure 120 can detect a data freeze which would prevent access to file 165(1) by application 155. A file system (or file system structure) can experience a data freeze for several reasons, one reason being for the purposes of a snapshot. Before a snapshot of data in a storage device is taken, the file system which controls access to the data in the storage device is frozen so that the snapshot can be taken without intervening modifications to the data (e.g., by an application) during the taking of the snapshot.

In some embodiments, the method, at 310, determines if the data freeze of file system structure 120 is the result of a snapshot. If the data freeze is the result of a snapshot, the method, at 315, sets an NVSD flag (also called IDIRTY flag) in the inode of the NVSD (e.g., in NVSD inode 140(1) of NVSD 170(1)), and as shown in 320, application 155 is served data only from PSD 150. In this example, the NVSD flag is a persistent flag. In one embodiment, the NVSD flag is set when the generation count associated with PSD 150 is increased (prior to any writes to the file), and is cleared when the generation count associated with NVSD 170(1) is updated (e.g., after the copying of PSD cgen from the PSD inode to the NVSD inode as illustrated in FIG. 2C), and as shown in 325 and 330. In this manner, if computing device 105(1) crashes after the PSD cgen and NVSD cgen values have been synchronized, and data has to be restored from a snapshot, application 155 will be served data in a consistent manner (e.g., only from PSD 150 because generation count module 125 will find the NVSD flag set and will not serve application 155 data from cache 175(1)).

Another situation may arise in the snapshot context where the value of the generation counts between the PSD and the NVSD may be the same, but the data is different, and therefore, inconsistent. For example, if application 155 performs additional write transactions to file 165(1) after the PSD cgen has been copied over to the NVSD inode (as depicted in FIG. 2C), the PSD cgen will be increased because of these additional write transactions. However, the NVSD cgen will remain the same because a last close of the file has not yet occurred (NVSD cgen is updated upon the last close of the file). In a volume-level snapshot is taken at this point in time, the snapshot will reflect the increased PSD cgen value. If application 155 performs yet more additional write transactions to file 165(1) after the taking of the snapshot, the write transactions are written to both the PSD and the NVSD, but not the snapshot. If then, a last close of the file is detected (as shown in FIG. 2C), the PSD cgen is copied from the PSD inode to the NVSD inode. In this instance, if computing device 105(1) crashes and the data is restored from the previously taken snapshot, inconsistency in data can occur because the PSD cgen and NVSD cgen are identical, but the data in the snapshot is inconsistent because the snapshot does not reflect the additional write transactions performed by application 155 after the taking of the snapshot.

Figure 3B:
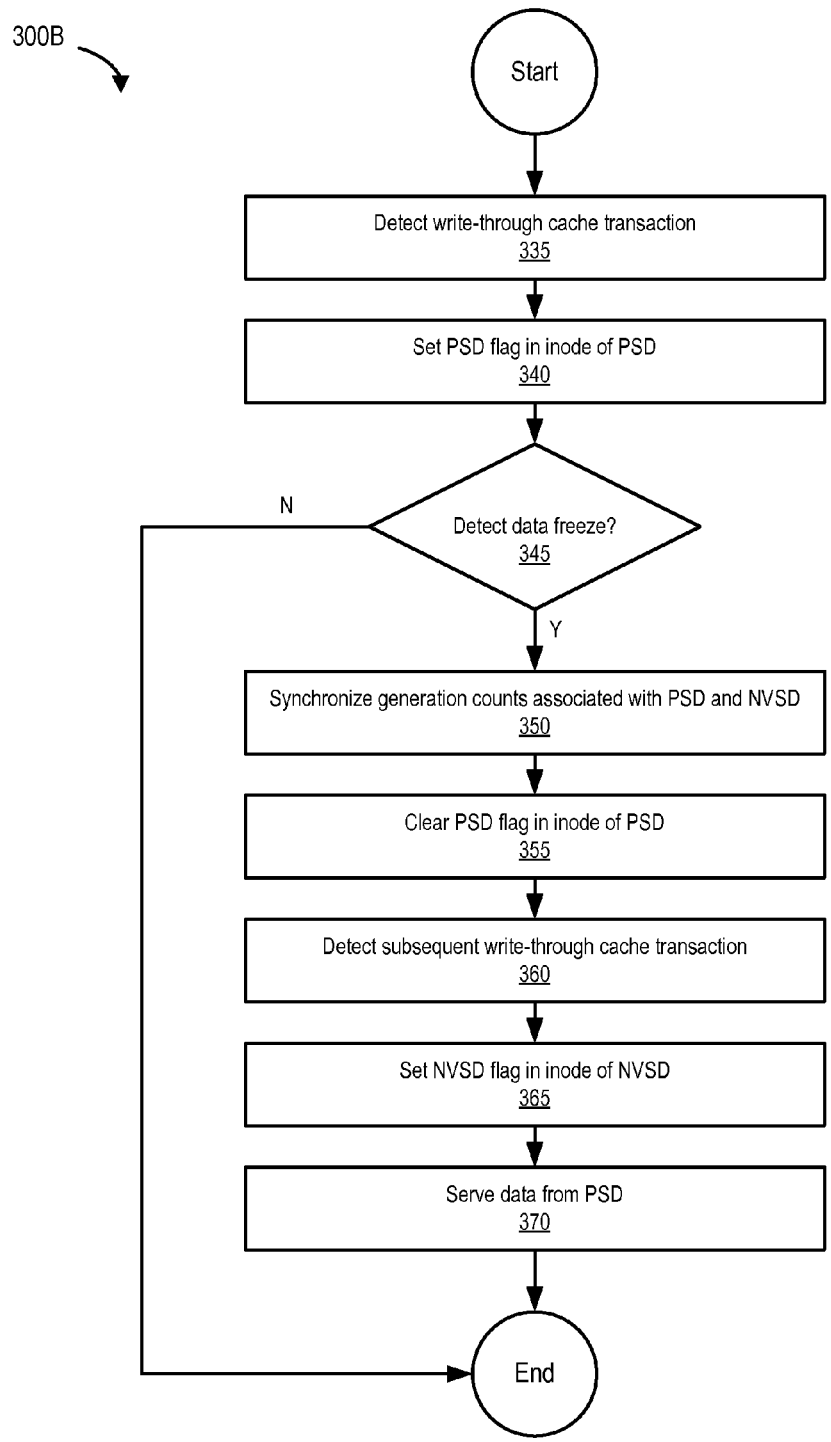
FIG. 3B is a flowchart of optimizing cache consistency between storage devices after a file system is thawed, according to one embodiment of the present invention.

FIG. 3B is a flowchart of a method of synchronizing generation counts associated with a PSD and a NVSD (e.g., synchronizing PSD cgen and NVSD cgen). The method begins at 335 be detecting a write-through cache transaction and, at 340, sets the PSD flag in the PSD inode. At 345, the method detects a data freeze. A volume-level snapshot is taken by freezing the file system which controls the data stored in storage devices associated with the file system. During a data freeze, no transactions (e.g., Input/Output (I/O) operations) are permitted with data stored on the storage device of which a snapshot is being taken because access to the file system by an application is blocked.

If a data freeze is detected, the PSD flag (e.g., the ICGENDIRTY flag) associated with all files in PSD 150 is reset (or cleared), and at 350, the method synchronizes the generation counts of the PSD and the NVSD (e.g., synchronizes the values of the PSD cgen and the NVSD cgen). After the PSD flag is cleared at 355, at 360, the method detects subsequent write-through cache transactions (e.g., after the data freeze) and, at 365, sets the NVSD flag in the inode of the NVSD and the PSD flag in the inode of the PSD. In one or more embodiments, the subsequent write-through cache transactions per permitted only after file system structure 120 is thawed (e.g., access is once again permitted to data in PSD 150 by application 155). In this example, before the subsequent write-through cache transactions are performed, the PSD flag (in-memory) and the NVSD flag (on-disk) are set. The method ends at 370 by serving data to application 155 from the PSD ensuring cache consistency. However, in this example, and according to other embodiments, data can also be served from the NVSD.

In some embodiments, the NVSD flag is set when the PSD flag is set and the NVSD flag is cleared when the PSD flag is cleared (e.g., after synchronizing the NVSD cgen and the PSD cgen as depicted in FIG. 3B). In this example, the NVSD flag is persistent. It will be appreciated that the aforementioned solution can also be applied to a cluster environment. In a cluster environment, the PSD flag is maintained cluster-wide. After a last close of a file has been detected from all the nodes in the cluster, the NVSD cgen (on all the nodes in the cluster which have the file cached) and the PSD cgen are synchronized.

An Example Computing Environment

Figure 4:
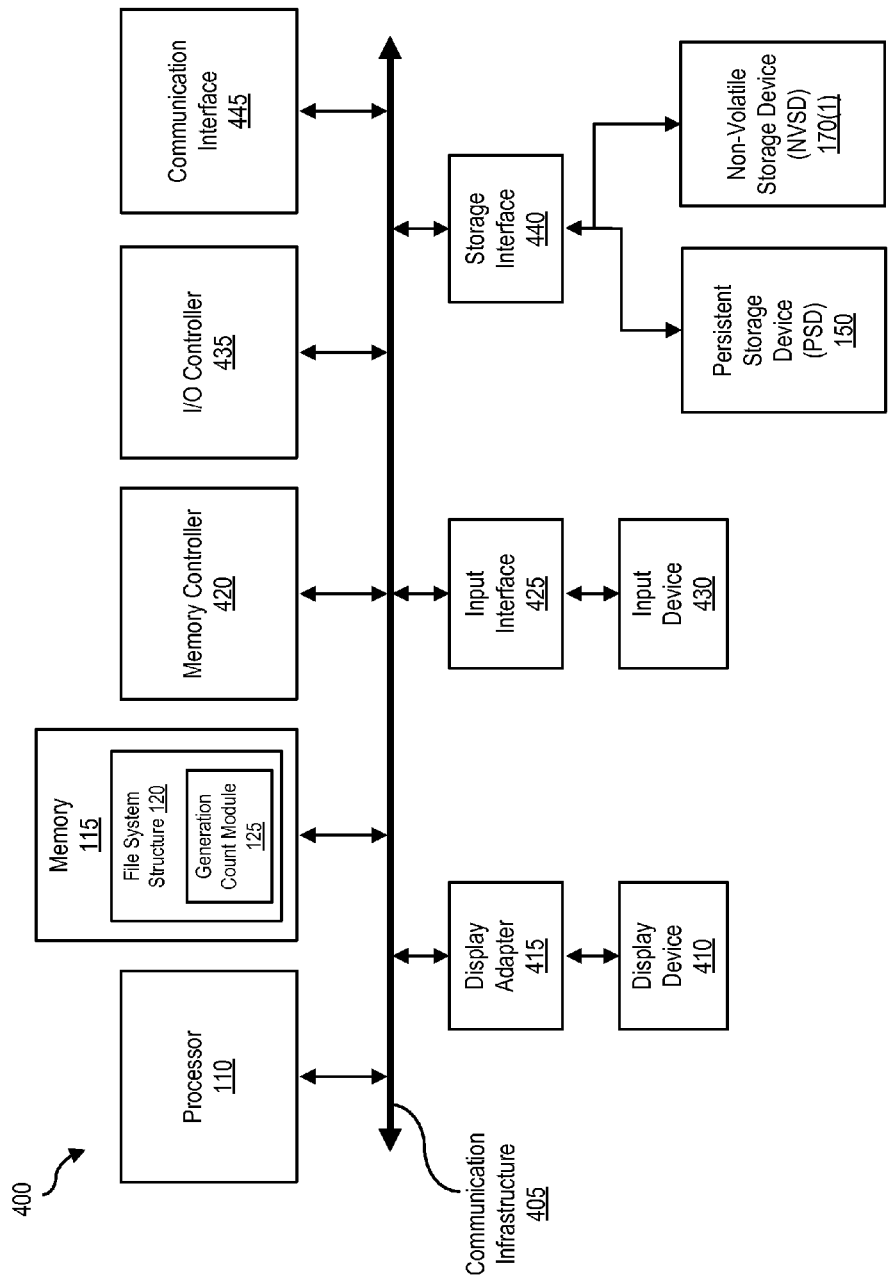
FIG. 4 is a block diagram of a computing device, illustrating how a generation count module can be implemented in software, according to one embodiment of the present invention.

FIG. 4 is a block diagram of a computing device 105(1) capable of optimizing cache consistency as described above. Computing device 105(1) broadly represents any single or multi-processor computing device or system capable of executing computer-readable instructions. Examples of computing device 105(1) include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing device 105(1) may include at least one processor 110 and a memory 115. By executing the software that implements generation count module 125, computing device 105(1) becomes a special purpose computing device that is configured to optimize cache consistency.

Processor 110 generally represents any type or form of processing unit capable of processing data or interpreting and executing instructions. In certain embodiments, processor 110 may receive instructions from a software application or module. These instructions may cause processor 110 to perform the functions of one or more of the embodiments described and/or illustrated herein. For example, processor 110 may perform and/or be a means for performing all or some of the operations described herein. Processor 110 may also perform and/or be a means for performing any other operations, methods, or processes described and/or illustrated herein.

Memory 115 generally represents any type or form of volatile or non-volatile storage device or medium capable of storing data and/or other computer-readable instructions. Examples include, without limitation, random access memory (RAM), read only memory (ROM), flash memory, or any other suitable memory device. Although not required, in certain embodiments, computing device 105(1) may include both a volatile memory unit and a non-volatile storage device. In one example, program instructions implementing a cache consistency optimization operation may be loaded into memory 115.

In certain embodiments, computing device 105(1) may also include one or more components or elements in addition to processor 110 and memory 115. For example, as illustrated in FIG. 4, computing device 105(1) may include a memory controller 420, an Input/Output (I/O) controller 435, and a communication interface 445, each of which may be interconnected via a communication infrastructure 405. Communication infrastructure 405 generally represents any type or form of infrastructure capable of facilitating communication between one or more components of a computing device. Examples of communication infrastructure 405 include, without limitation, a communication bus (such as an Industry Standard Architecture (ISA), Peripheral Component Interconnect (PCI), PCI express (PCIe), or similar bus) and a network.

Memory controller 420 generally represents any type or form of device capable of handling memory or data or controlling communication between one or more components of computing system 400. For example, in certain embodiments memory controller 420 may control communication between processor 110, memory 115, and I/O controller 435 via communication infrastructure 405. In certain embodiments, memory controller 420 may perform and/or be a means for performing, either alone or in combination with other elements, one or more of the operations or features described and/or illustrated herein.

I/O controller 435 generally represents any type or form of module capable of coordinating and/or controlling the input and output functions of a computing device. For example, in certain embodiments I/O controller 435 may control or facilitate transfer of data between one or more elements of computing device 105(1), such as processor 110, memory 115, communication interface 445, display adapter 415, input interface 425, and storage interface 440.

Communication interface 445 broadly represents any type or form of communication device or adapter capable of facilitating communication between computing device 105(1) and one or more additional devices. For example, in certain embodiments communication interface 445 may facilitate communication between computing system 400 and a private or public network including additional computing systems. Examples of communication interface 445 include, without limitation, a wired network interface (such as a network interface card), a wireless network interface (such as a wireless network interface card), a modem, and any other suitable interface. In at least one embodiment, communication interface 445 may provide a direct connection to a remote server via a direct link to a network, such as the Internet. Communication interface 445 may also indirectly provide such a connection through, for example, a local area network (such as an Ethernet network), a personal area network, a telephone or cable network, a cellular telephone connection, a satellite data connection, or any other suitable connection.

In certain embodiments, communication interface 445 may also represent a host adapter configured to facilitate communication between computing device 105(1) and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like.

Communication interface 445 may also allow computing device 105(1) to engage in distributed or remote computing. For example, communication interface 445 may receive instructions from a remote device or send instructions to a remote device for execution.

As illustrated in FIG. 4, computing device 105(1) may also include at least one display device 410 coupled to communication infrastructure 405 via a display adapter 415. Display device 410 generally represents any type or form of device capable of visually displaying information forwarded by display adapter 415. Similarly, display adapter 415 generally represents any type or form of device configured to forward graphics, text, and other data from communication infrastructure 405 (or from a frame buffer, as known in the art) for display on display device 410.

As illustrated in FIG. 4, computing device 105(1) may also include at least one input device 430 coupled to communication infrastructure 405 via an input interface 425. Input device 430 generally represents any type or form of input device capable of providing input, either computer or human generated, to computing system 400. Examples of input device 430 include, without limitation, a keyboard, a pointing device, a speech recognition device, or any other input device.

As illustrated in FIG. 4, computing device 105(1) may also include a persistent storage device 150 and a non-volatile storage device 170(1). PSD 150 and NVSD 170(1) generally represents any type or form of storage device or medium capable of storing data and/or other computer-readable instructions. For example, PSD 150 and NVSD 170(1) may include a magnetic disk drive (e.g., a so-called hard drive), a floppy disk drive, a magnetic tape drive, an optical disk drive, a flash drive, or the like. Storage interface 440 generally represents any type or form of interface or device for transferring and/or transmitting data between PSD 150, NVSD 170(1) and other components of computing device 105(1).

In certain embodiments, PSD 150 and NVSD 170(1) may be configured to read from and/or write to a removable storage unit configured to store computer software, data, or other computer-readable information. Examples of suitable removable storage units include, without limitation, a floppy disk, a magnetic tape, an optical disk, a flash memory device, or the like. PSD 150 and NVSD 170(1) may also include other similar structures or devices for allowing computer software, data, or other computer-readable instructions to be loaded into computing system 400. For example, PSD 150 and NVSD 170(1) may be configured to read and write software, data, or other computer-readable information. PSD 150 and NVSD 170(1) may also be a part of computing device 105(1) or may be separate devices accessed through other interface systems.

Many other devices or subsystems may be connected to computing system 400. Conversely, all of the components and devices illustrated in FIG. 4 need not be present to practice the embodiments described and/or illustrated herein. The devices and subsystems referenced above may also be interconnected in different ways from that shown in FIG. 4.

Computing device 105(1) may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 400 for storage in memory via a network such as the Internet or upon a carrier medium.

The computer-readable medium containing the computer program may be loaded into computing system 400. All or a portion of the computer program stored on the computer-readable medium may then be stored in memory 115 and/or various portions of PSD 150 and NVSD 170(1). When executed by processor 110, a computer program loaded into Computing device 105(1) may cause processor 110 to perform and/or be a means for performing the functions of one or more of the embodiments described and/or illustrated herein. Additionally or alternatively, one or more of the embodiments described and/or illustrated herein may be implemented in firmware and/or hardware. For example, computing device 105(1) may be configured as an application specific integrated circuit (ASIC) adapted to implement one or more of the embodiments disclosed herein.

An Example Networking Environment

Figure 5:
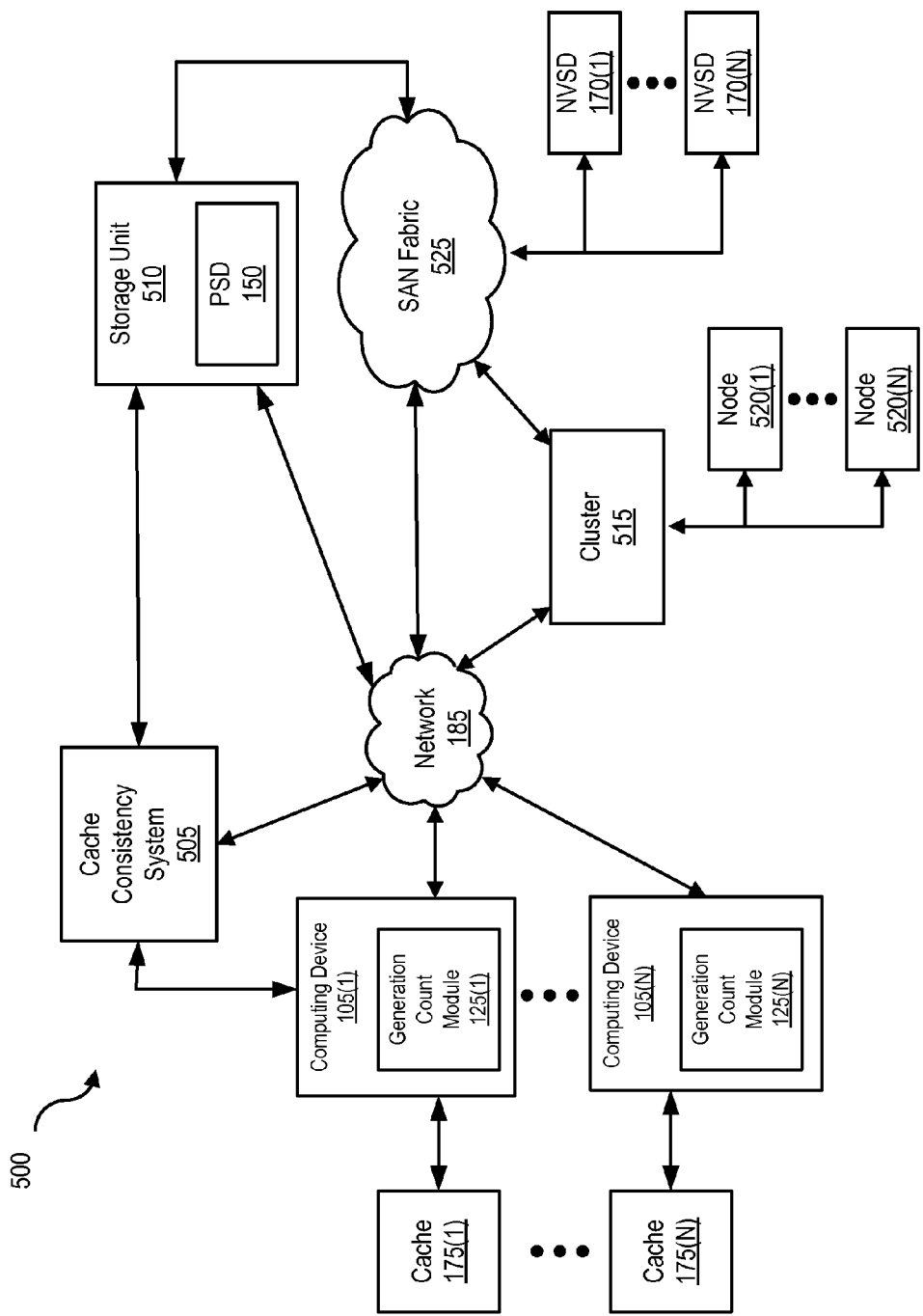
FIG. 5 is a block diagram of a networked system, illustrating how various computing devices can communicate via a network, according to one embodiment of the present invention.

FIG. 5 is a block diagram of a network architecture 500 in which computing device 105(1), PSD 150 and NVSD 170(1) may be coupled to network 185. As illustrated in FIG. 5, PSD 150 may be attached to NVSD 170(1) through network 185. In certain embodiments, network-attached storage (NAS) devices may be configured to communicate with PSD 150 and NVSD 170(1) using various protocols, such as Network File System (NFS), Server Message Block (SMB), or Common Internet File System (CIFS).

Computing devices 105(1)-(N) may also be connected to a network 185. Network 185 generally represents any type or form of computer network or architecture capable of facilitating communication between multiple computing devices. Network 185 may facilitate communication between computing devices 105(1)-(N), PSD 150, and NVSD 170(1)-(N). In certain embodiments, and with reference to computing device 105(1) of FIG. 4, a communication interface, such as communication interface 445 in FIG. 4, may be used to provide connectivity between PSD 150 and network 185. It should be noted that the embodiments described and/or illustrated herein are not limited to the Internet or any particular network-based environment. For example, network 185 can be a Storage Area Network (SAN).

In at least one embodiment, all or a portion of one or more of the embodiments disclosed herein may be encoded as a computer program and loaded onto and executed by computing devices 105(1)-(N), PSD 150, NVSD 170(1) or any combination thereof. All or a portion of one or more of the embodiments disclosed herein may also be encoded as a computer program, stored in computing devices 105(1)-(N) and distributed over network 185.

In some examples, all or a portion of the computing devices in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a generation count module may transform behavior of a server in order to cause the server and a non-volatile storage device to communicate with a persistent storage device.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
writing data to a file as part of a write transaction, wherein
the file is stored in a persistent storage device (PSD), and at least a portion of the file is stored in a non-volatile storage device (NVSD), and
the writing the data results in one or more modifications to the file;
determining that a PSD flag is not set, wherein
the PSD flag is associated with in-memory information; and
based on the determination that the PSD flag is not set,
increasing a generation count associated with the PSD, and
storing the in-memory information in the PSD before writing the data to the PSD and the NVSD as part of the write transaction, wherein
the PSD and the NVSD implement a write-through cache.

2. The method of claim 1, comprising
in response to detecting a subsequent write transaction associated with the file,
inhibiting the increase of the generation count associated with the PSD by virtue of accessing PSD metadata, wherein
the PSD metadata indicates that the PSD flag is set.

3. The method of claim 2, comprising
setting the PSD flag in an inode of the PSD prior to writing data to the file stored in the PSD and in the NVSD.

4. The method of claim 2, comprising
inhibiting the increase of a generation count associated with the NVSD after the write transaction and the subsequent write transaction.

5. The method of claim 2, comprising
accessing PSD metadata during the subsequent write transaction;
determining whether the PSD metadata indicates that the PSD flag is set;
if the PSD metadata indicates that the PSD flag is not set,
only increasing the generation count associated with the PSD while maintaining the generation count associated with the NVSD, and
setting the PSD flag; and
if the PSD metadata indicates that the PSD flag is set,
proceeding with the subsequent write transaction without increasing the generation count associated with the PSD or the generation count associated with the NVSD.

6. The method of claim 2, wherein
the write transaction and the subsequent write transaction are both write-through cache transactions.

7. The method of claim 1, wherein
the generation count associated with the PSD tracks a number of write transactions associated with the file stored in the PSD, except when the increase of the generation count associated with the PSD is inhibited by setting of the PSD flag.

8. The method of claim 3, comprising
copying the generation count from the inode of the PSD to an inode of the NVSD, wherein
the copying occurs,
after the subsequent write transaction, and
during deactivation of the inode of the PSD; and
clearing the PSD flag in the inode of the PSD, wherein
the clearing the PSD flag permits an increase of the generation count associated with the PSD upon a future write transaction.

9. The method of claim 8, wherein
the inode of the PSD is deactivated after a last close of the file.

10. The method of claim 8, comprising
detecting a data freeze of data in the PSD;
determining whether the data freeze due to a snapshot;
setting a NVSD flag in an inode of the NVSD if the data freeze is the result of a snapshot, wherein
the NVSD flag is configured to indicate persistent information;
upon restoration of the snapshot,
detecting the NVSD flag in the inode of the NVSD, and
serving data from the PSD instead of the NVSD; and
clearing the PSD flag and the NVSD flag after copying the generation count associated with the PSD from an inode of the PSD to the inode of the NVSD.

11. The method of claim 10, wherein
detecting the NVSD flag in the inode of the NVSD indicates inconsistency between data stored in the PSD and data stored in the NVSD.

12. The method of claim 10, comprising
detecting a cache transaction, wherein
the cache transaction increases the generation count associated with the PSD, but not the generation count associated with the NVSD;
setting the PSD flag in the inode of the PSD;
detecting another snapshot of data in the PSD, wherein
the another snapshot is taken after the cache transaction,
the taking of the another snapshot causes a file system structure associated with the PSD and the NVSD to experience a data freeze,
synchronizing the generation count associated with the PSD and the generation count associated with the NVSD, and
clearing the PSD flag and the NVSD flag;
detecting one or more other cache transactions after the cache transaction, wherein
the one or more cache transactions causes the increase of the generation count associated with the PSD; and
setting another NVSD flag in the inode of the NVSD.

13. A non-transitory computer readable storage medium storing program instructions executable to:
  write data to a file as part of a write transaction, wherein
    the file is stored in a persistent storage device (PSD), and at least a portion of the file is stored in a non-volatile storage device (NVSD), and
    the writing the data results in one or more modifications to the file;
  determine that a PSD flag is not set, wherein
    the PSD flag is associated with in-memory information; and
  based on the determination that the PSD flag is not set,
    increase a generation count associated with the PSD, and
    store the in-memory information in the PSD before writing the data to the PSD and the NVSD as part of the write transaction, wherein
      the PSD and the NVSD implement a write-through cache.

14. The non-transitory computer readable storage medium of claim 13, wherein
  the PSD flag is an in-memory flag.

15. The non-transitory computer readable storage medium of claim 13, comprising
  in response to detecting a subsequent write transaction associated with the file,
    inhibiting the increase of the generation count associated with the PSD by virtue of accessing PSD metadata, wherein
      the PSD metadata indicates that the PSD flag is set.

16. The non-transitory computer readable storage medium of claim 15, comprising
  detecting a data freeze of data in the PSD;
  determining whether the data freeze due to a snapshot;
  setting a NVSD flag in an inode of the NVSD if the data freeze is a result of the snapshot, wherein
    the NVSD flag is configured to indicate persistent information;
  upon restoration of the snapshot,
    detecting the NVSD flag in the inode of the NVSD, and serving data from the PSD instead of the NVSD; and
  clearing the PSD flag and the NVSD flag after copying the generation count associated with the PSD from an inode of the PSD to the inode of the NVSD.

17. A system comprising:
  one or more processors; and
  a memory coupled to the one or more processors, wherein the memory stores program instructions executable by the one or more processors to:
  write data to a file as part of a write transaction, wherein
    the file is stored in a persistent storage device (PSD), and at least a portion of the file is stored in a non-volatile storage device (NVSD), and
    the writing the data results in one or more modifications to the file;
  determine that a PSD flag is not set, wherein
    the PSD flag is associated with in-memory information; and
  based on the determination that the PSD flag is not set,
    increase a generation count associated with the PSD, and
    store the in-memory information in the PSD before writing the data to the PSD and the NVSD as part of the write transaction, wherein
      the PSD and the NVSD implement a write-through cache.

18. The system of claim 17, comprising
  in response to detecting a subsequent write transaction associated with the file,
    inhibiting the increase of the generation count associated with the PSD by virtue of accessing PSD metadata, wherein
      the PSD metadata indicates that the PSD flag is set.

19. The system of claim 18, comprising
  detecting a data freeze of data in the PSD;
  determining whether the data freeze due to a snapshot;
  setting a NVSD flag in an inode of the NVSD if the data freeze is a result of the snapshot, wherein
    the NVSD flag is configured to indicate persistent information;
  upon restoration of the snapshot,
    detecting the NVSD flag in the inode of the NVSD, and serving data from the PSD instead of the NVSD; and
  clearing the PSD flag and the NVSD flag after copying the generation count associated with the PSD from an inode of the PSD to the inode of the NVSD.

20. The method of claim 1, wherein
  storing the in-memory information in the PSD before writing the data to the PSD and the NVSD as part of the write transaction prevents increase of a generation count associated with the NVSD while the data is being written to the PSD and the NVSD.

* * * * *